US011920255B2

(12) United States Patent
Kotani et al.

(10) Patent No.: US 11,920,255 B2
(45) Date of Patent: Mar. 5, 2024

(54) COMPOSITE PLATED PRODUCT AND METHOD FOR PRODUCING SAME

(71) Applicant: Dowa Metaltech Co., Ltd., Tokyo (JP)

(72) Inventors: Hirotaka Kotani, Tokyo (JP); Yukiya Kato, Tokyo (JP); Tatsuhiro Doi, Tokyo (JP); Takao Tomiya, Tokyo (JP); Hiroto Narieda, Tokyo (JP)

(73) Assignee: Dowa Metaltech Co., Ltd., Tokyo (JP)

( * ) Notice: Subject to any disclaimer, the term of this patent is extended or adjusted under 35 U.S.C. 154(b) by 0 days.

(21) Appl. No.: 17/630,564

(22) PCT Filed: Jun. 4, 2020

(86) PCT No.: PCT/JP2020/022071
§ 371 (c)(1),
(2) Date: Jan. 27, 2022

(87) PCT Pub. No.: WO2021/019907
PCT Pub. Date: Feb. 4, 2021

(65) Prior Publication Data

US 2022/0259753 A1 Aug. 18, 2022

(30) Foreign Application Priority Data

Aug. 1, 2019 (JP) ................................ 2019-141916

(51) Int. Cl.

| | |
|---|---|
| ***C25D 3/46*** | (2006.01) |
| ***C25D 5/48*** | (2006.01) |
| ***C25D 7/00*** | (2006.01) |
| ***H01H 1/023*** | (2006.01) |
| ***H01H 1/027*** | (2006.01) |
| ***H01R 13/03*** | (2006.01) |

(52) U.S. Cl.
CPC ................ *C25D 3/46* (2013.01); *C25D 5/48* (2013.01); *C25D 7/00* (2013.01); *H01H 1/023* (2013.01); *H01H 1/027* (2013.01); *H01R 13/03* (2013.01); *Y10T 428/12625* (2015.01)

(58) Field of Classification Search
None
See application file for complete search history.

(56) References Cited

U.S. PATENT DOCUMENTS

| | | | | |
|---|---|---|---|---|
| 5,290,422 | A | 3/1994 | Ag | |
| 7,638,721 | B2 * | 12/2009 | Rehbein | H01R 13/03 428/614 |
| 2004/0011433 | A1 * | 1/2004 | Shiozaki | C25D 15/02 148/400 |
| 2005/0282006 | A1 * | 12/2005 | Miyazawa | C25D 15/02 205/109 |
| 2006/0135282 | A1 * | 6/2006 | Palumbo | B82Y 30/00 473/316 |
| 2015/0037608 | A1 * | 2/2015 | Shinohara | H01H 1/02 428/673 |

FOREIGN PATENT DOCUMENTS

| | | | |
|---|---|---|---|
| JP | 03253598 | A | 11/1991 |
| JP | 097445 | A | 1/1997 |
| JP | 2000128640 | A | 5/2000 |
| JP | 2006037225 | A | 2/2006 |
| JP | 2007092144 | A * | 4/2007 |
| JP | 2007254876 | A * | 10/2007 |
| JP | 2007254876 | A | 10/2007 |
| JP | 2007262528 | A | 10/2007 |
| JP | 2009249648 | A | 10/2009 |
| JP | 2013091289 | A | 5/2013 |
| JP | 2016219524 | A | 12/2016 |
| JP | 2017052978 | A | 3/2017 |
| JP | 2018199839 | A | 12/2018 |
| WO | 2015083547 | A1 | 6/2015 |

OTHER PUBLICATIONS

International search report for patent application No. PCT/JP2020/022071 dated Aug. 25, 2020.

* cited by examiner

*Primary Examiner* — Seth Dumbris
(74) *Attorney, Agent, or Firm* — Bachman & LaPointe, P.C.

(57) ABSTRACT

There are provided a composite plated product wherein a composite plating film of a composite material containing carbon particles in a silver layer is formed on a base material and wherein the amount of the carbon particles dropped out of the composite plating film is small, and a method for producing the same. After a composite plating film of a composite material containing carbon particles in a silver layer is formed on a base material (of preferably copper or a copper alloy) by electroplating using a silver-plating solution to which the carbon particles are added, a treatment for removing part of the carbon particles on the surface thereof is carried out.

9 Claims, No Drawings

COMPOSITE PLATED PRODUCT AND METHOD FOR PRODUCING SAME

BACKGROUND OF THE INVENTION

The present invention generally relates to a composite plated product and a method for producing the same. More specifically, the invention relates to a composite plated product which is used as a material of sliding contact parts such as switches and connectors.

Conventionally, as materials of sliding contact parts such as switches and connectors, there are used silver-plated products wherein a conductive material such as copper or a copper alloy is plated with silver in order to prevent oxidation of the conductive material due to heating in sliding processes.

However, there is a problem in that silver-plating films are easily stripped by sliding since they are soft and easy to wear and since they generally have high coefficients of friction. In order to solve this problem, there is proposed a method for improving the wear resistance of a conductive material by forming a coating film of a composite material on the conductive material by electroplating, the composite material containing graphite particles which are chosen from carbon particles, such as graphite particles and carbon black particles, having good heat resistance, wear resistance, lubricity and so forth and which are dispersed in a silver matrix (see, e.g., Patent Document 1). There is also proposed a method for producing a silver-plating film, which contains graphite particles, by means of a plating bath to which a wetting agent suitable for the dispersion of graphite particles is added (see, e.g., Patent Document 2). Moreover, there is proposed a method for coating carbon particles with a metal oxide or the like by the sol-gel method to enhance the dispersibility of the carbon particles in a composite plating solution of silver and the carbon particles to increase the quantity of the carbon particles in a composite plating film (see, e.g., Patent Document 3).

However, composite plated products produced by the methods disclosed in Patent Documents 1-3 have relatively high coefficients of friction, so that there is a problem in that it is not possible to use the composite plated products as the materials of long-life contacts and terminals. Therefore, it is desired to provide a composite plated product which has a larger content of carbon particles and a higher percentage of an area occupied by the carbon particles on the surface thereof than those of the composite plated products produced by the methods disclosed in Patent Documents 1-3 and which has a better wear resistance than that of the composite plated products produced by the methods disclosed in Patent Documents 1-3.

As methods for producing such composite plated products, there are proposed a method for electroplating a base material using a cyanide-containing silver-plating solution, to which carbon particles treated by an oxidation treatment, to form a coating film of a composite material are added, which contains the carbon particles in a silver layer, on the base material (see, e.g., Patent Document 4), a method for electroplating a base material using a composite plating solution prepared by adding carbon particles, which are treated by silane coupling after being treated by oxidation, to a silver-plating solution containing silver nitrate and ammonium nitrate, to form a coating film of a composite material, which contains the carbon particles in a silver layer, on the base material (see, e.g., Patent Document 5), and so forth.

PRIOR ART DOCUMENT(S)

Patent Document(s)

Patent Document 1: JP 1109-007445 A (Paragraph Numbers 0005-0007)
Patent Document 2: JP 1105-505853 A (Pages 1-2)
Patent Document 3: JP 1103-253598 A (Page 2)
Patent Document 4: JP 2006-037225 A (Paragraph Number 0009)
Patent Document 5: JP 2007-262528 A (Paragraph Numbers 0008-0009)

SUMMARY OF THE INVENTION

However, if the composite plated product produced by the method of Patent Document 4 is used as the material of sliding contact parts such as switches and connectors, when the composite plated product is press-worked, there is some possibility that the carbon particles of the surface layer may be dropped out to be mixed in a press forming oil to dirty facilities and that the dropped carbon particles may short-circuit an electronic device (using the sliding contact parts or the like).

In the method of Patent Document 5, it is required to further form a silver-plating film on the composite plating film of the composite plated product, so that the producing costs thereof are increased. In addition, there is some possibility that the silver-plating film formed on the composite plating film may be peeled off to short-circuit an electronic device and that the carbon particles exposed by the peeling of the silver-plating film may be dropped out to be mixed in a press forming oil to dirty facilities.

It is therefore an object of the present invention to eliminate the aforementioned conventional problems and to provide a composite plated product wherein a composite plating film of a composite material containing carbon particles in a silver layer is formed on a base material and wherein the amount of the carbon particles dropped out of the composite plating film is small, and a method for producing the same.

In order to accomplish the aforementioned object, the inventors have diligently studied and found that it is possible to produce a composite plated product wherein a composite plating film of a composite material containing carbon particles in a silver layer is formed on a base material and wherein the amount of the carbon particles dropped out of the composite plating film is small, if a treatment for removing part of carbon particles on the surface of a composite plating film of a composite material containing the carbon particles in a silver layer is carried out after the composite plating film is formed on a base material by electroplating using a silver-plating solution to which the carbon particles are added. Thus, the inventors have made the present invention.

According to the present invention, there is provided a method for producing a composite plated product, the method comprising the steps of: preparing a silver-plating solution, to which carbon particles are added; forming a composite plating film of a composite material, which contains the carbon particles in a silver layer, on a base material by electroplating the base material using the silver-plating solution containing the carbon particles; and carrying out a treatment for removing part of the carbon particles on the surface of the composite plating film.

In this method for producing a composite plated product, the treatment for removing part of the carbon particles is preferably a treatment for ultrasonic cleaning or electrolytic cleaning the surface of the composite plating film. In this case, the ultrasonic cleaning is preferably carried out at 20 to 100 kHz for 1 to 300 seconds, and the electrolytic cleaning is preferably carried out at 1 to 30 A/dm$^2$ for 10 to 300 seconds. The removal rate of the carbon particles removed by the treatment for removing part of the carbon particles on the surface of the composite plating film is preferably in the range of from 20 area % to 75 area %. The carbon particles are preferably graphite particles having an average particle diameter of 1 to 15 μm. The silver-plating solution is preferably a sulfonic acid-containing silver-plating solution. The amount of the carbon particles, which are added to the silver-plating solution, is preferably in the range of from 10 g/L to 100 g/L. The electroplating is preferably carried out at a current density of 0.5 to 10 A/dm$^2$. The base material is preferably made of copper or a copper alloy. Before the composite plating film of the composite material is formed, a nickel-plating film is preferably formed on the base material.

According to the present invention, there is provided a composite plated product comprising: a base material; and a composite plating film of a composite material which contains carbon particles in a silver layer, the composite plating film being formed on the base material, wherein the percentage of an area occupied by the carbon particles on the surface of the composite plating film is in the range of from 1 area % to 50 area %, and wherein the number of the carbon particles adhered to an adhesive tape having an adhesive force of 4.02 N/10 mm is not larger than 35,000/mm$^2$ when the adhesive tape is peeled off from the surface of the composite plating film after it is put thereon.

In this composite plated product, the composite plating film preferably has a thickness of 0.5 to 15 μm. The composite plated product preferably has a surface roughness Ra of 0.2 to 1.7 μm, and preferably has a friction coefficient of not larger than 0.8. Between the composite plating film and the base material, a nickel-plating film is preferably formed.

According to the present invention, there is provided a terminal, the material of which is the above-described composite plated product.

According to the present invention, it is possible to produce a composite plated product wherein a composite plating film of a composite material containing carbon particles in a silver layer is formed on a base material and wherein the amount of the carbon particles dropped out of the composite plating film is small.

DETAILED DESCRIPTION

In the preferred embodiment of a method for producing a composite plated product according to the present invention, a treatment for removing part of carbon particles on the surface of a composite plating film of a composite material containing the carbon particles in a silver layer is carried out after the composite plating film is formed on a base material (of preferably copper or a copper alloy) by electroplating using a silver-plating solution to which the carbon particles are added.

In this method for producing a composite plated product, the treatment for removing part of the carbon particles on the surface of the composite plating film is preferably a treatment for ultrasonic cleaning or electrolytic cleaning the surface of the composite plating film, although it may be a treatment such as ultrasonic cleaning, electrolytic cleaning, high-pressure washing or buffing. In the case of ultrasonic cleaning, it is preferably carried out at 20 to 100 kHz for 1 to 300 seconds, and more preferably carried out at 25 to 50 kHz for 2 to 270 seconds. In the case of the electrolytic cleaning, it is preferably carried out at 1 to 30 A/dm$^2$ for 10 to 300 seconds, and more preferably carried out at 2 to 25 A/dm$^2$ for 20 to 270 seconds. The removal rate of the carbon particles removed by the treatment for removing part of the carbon particles on the surface of the composite plating film is preferably in the range of from 20 area % to 75 area %, and more preferably in the range of from 25 to 70 area %.

The carbon particles are preferably graphite particles. The average particle diameter of the graphite particles is preferably in the range of from 0.5 μm to 15 μm, and more preferably in the range of from 1 μm to 10 μm. The oxidation treatment for carbon particles is preferably carried out for removing lipophilic organic substances absorbed onto the surface of the carbon particles. Such lipophilic organic substances include aliphatic hydrocarbons such as alkanes and alkenes, and aromatic hydrocarbons such as alkylbenzene. As the oxidation treatment for carbon particles, there may be used a wet oxidation treatment, and a dry oxidation treatment using oxygen gas or the like. In view of mass production, a wet oxidation treatment is preferably used. If a wet oxidation treatment is used, it is possible to uniformly treat carbon particles having a large surface area. As the wet oxidation treatment, there may be used a method for suspending carbon particles in water to add an optimum quantity of oxidizing agent thereto. The oxidizing agent may be nitric acid, hydrogen peroxide, potassium permanganate, potassium persulfate, sodium perchlorate or the like. It is considered that the lipophilic organic substances adhered to carbon particles are oxidized by the added oxidizing agent so as to be soluble in water to be suitably removed from the surface of the carbon particles. If the carbon particles treated by the wet oxidation treatment are filtered and washed with water, it is possible to further enhance the function of removing the lipophilic organic substances from the surface of the carbon particles. The lipophilic organic substances, such as aliphatic and aromatic hydrocarbons, can be removed from the surface of the carbon particles by the oxidation treatment for carbon particles. According to analysis based on gases heated at 300° C., gases generated by heating carbon particles to 300° C. after the oxidation treatment hardly contain lipophilic aliphatic hydrocarbons such as alkanes and alkenes, and lipophilic aromatic hydrocarbons such as alkylbenzenes. Even if the carbon particles after the oxidation treatment slightly contain aliphatic and aromatic hydrocarbons, the carbon particles can be dispersed in a silver-plating solution. However, the carbon particles do not preferably contain hydrocarbons having a molecular weight of 160 or more, and the intensity (the intensity in purge and trap gas chromatography and mass spectroscopy) of gases heated at 300° C. to be generated from hydrocarbons having a molecular weight of less than 160 in the carbon particles is preferably 5,000,000 or less.

The silver-plating solution is preferably a sulfonic acid-containing silver-plating solution. The sulfonic acid-containing silver-plating solution contains silver sulfonate serving as Ag ion source, and sulfonic acid serving as a complexing agent, and may contain an addition agent such as a brightener. The concentration of Ag in the silver-plating solution is preferably 5 to 150 g/L, more preferably 10 to 120 g/L and most preferably 20 to 100 g/L. The silver sulfonate contained in the sulfonic acid-containing silver-plating solution may be silver methanesulfonate, silver alkanolsulfonate, silver phenolsulfonate or the like.

The amount of the carbon particles, which are added to the silver-plating solution, is preferably in the range of from 10 g/L to 100 g/L, more preferably in the range of from 15 g/L to 90 g/L and most preferably in the range of from 20 g/L to 70 g/L. If the amount of the carbon particles in the silver-plating solution is less than 10 g/L, there is some possibility that it is not possible to sufficiently increase the content of the carbon particles in the composite plating layer. Even if the amount of the carbon particles in the silver-plating solution exceeds 100 g/L, it is not possible to further increase the content of the carbon particles in the composite plating layer.

The electroplating for forming the composite plating film is preferably carried out at a current density of 0.5 to 10 A/dm$^2$, more preferably carried out at a current density of 1 to 5 A/dm$^2$, and most preferably carried out at a current density of 2 to 4 A/dm$^2$. If the concentration of Ag and the current density are too low, the composite plating film is slowly formed, so that it is not efficient. If the concentration of Ag and the current density are too high, the uneven appearance of the composite plating film is easily caused.

As the preferred embodiment of a method for producing a composite plated product according to the present invention, the silver-plating solution, to which the carbon particles are added, is used for electroplating, so that it is possible to produce a composite plated product wherein a composite plating film of a composite material containing carbon particles in a silver layer is formed on a base material, the composite plated product having a high percentage of the area occupied by the carbon particles on the surface thereof, the composite plated product having good wear resistance. In addition, the treatment for removing part (carbon particles easily dropped out) of the carbon particles on the surface of the composite plating film of the composite material (preferably the treatment for ultrasonic cleaning or electrolytic cleaning the surface of the composite plating film) is carried out, so that it is possible to product a composite plated product wherein a composite plating film of a composite material containing carbon particles in a silver layer is formed on a base material and wherein the amount of the carbon particles dropped out of the composite plating film is small.

The preferred embodiment of a composite plated product according to the present invention comprises: a base material (of preferably copper or a copper alloy); and a composite plating film of a composite material, which contains carbon particles in a silver layer, the composite plating film being formed on the base material, wherein the percentage of an area occupied by the carbon particles on the surface of the composite plating film is in the range of from 1 area % to 50 area %, and wherein the number of the carbon particles adhered to an adhesive tape having an adhesive force of 4.02 N/10 mm is not larger than 35,000/mm$^2$ (preferably not larger than 10,000/mm$^2$) when the adhesive tape is peeled off from the surface of the composite plating film after it is put thereon. If the percentage of the area occupied by the carbon particles on the surface of the composite plating film is less than 1 area %, the wear resistance of the composite plated product is not sufficient. On the other hand, if it exceeds 50 area %, the contact resistance of the composite plated product is increased.

The thickness of the composite plating film is preferably 0.5 to 15 μm, more preferably 1 to 10 μm and most preferably 3 to 8 μm. If the thickness of the composite plating film is less than 0.5 μm, the wear resistance of the composite plated product is not sufficient. On the other hand, if it exceeds 15 μm, the amount of silver is increased, so that the producing costs of the composite plated product is increased. In order to improve the heat resistance of the composite plated product, a nickel-plating film (preferably having a thickness of 0.5 to 5 μm) may be formed between the composite plating film and the base material. The surface roughness Ra of the composite plated product is preferably 0.2 to 1.7 μm and more preferably 0.2 to 1.3 μm. The coefficient of friction of the composite plated product is preferably 0.8 or less, more preferably 0.6 or less, and most preferably 0.1 to 0.5.

Furthermore, if two test pieces are cut-off from the preferred embodiment of a composite plated product according to the present invention, one of the test pieces being used as a plate-shaped test piece (an evaluating sample), and the other test piece being indented (semi-spherically punched so as to have an inside R of 1.0 mm) to be used as an indented test piece (indenter), and if the wear resistance of the composite plated product is evaluated by carrying out an abrasion test for confirming the abrasion status of the plate-shaped test piece when the reciprocating sliding movement (sliding distance=10 mm, sliding speed=3 mm/s) is continued until the base material is exposed while the indented test piece is pushed against the plate-shaped test piece at a constant load (2N) by means of a sliding abrasion testing machine, the base material is not preferably exposed after the reciprocating sliding movement is repeated 500 times. If forces applied in the horizontal directions during the above-described reciprocating sliding movement are measured to calculate an average value F thereof and if a coefficient (μ) of dynamic friction between the plate-shaped test piece and the indented test piece is calculated from μ=F/N, the coefficient of dynamic friction is preferably 0.8 or less, and more preferably 0.6 or less.

EXAMPLES

Examples of a composite plated product and a method for producing the same according to the present invention will be described below in detail.

Example 1

First, 6% by weight of scale-shaped graphite particles having an average particle diameter of 5 μm were prepared as carbon particles to be added to 3 L of pure water. The mixed solution thus obtained was heated to 50° C. while being stirred. Then, 1.2 L of an aqueous solution containing 0.1 mol/L of potassium persulfate was prepared as an oxidizing agent to be gradually dropped to the mixed solution, and then, stirred for two hours to carry out an oxidation treatment. Thereafter, filtration was carried out by means of a filter paper, and washing was carried out.

With respect to carbon particles before and after the oxidation treatment, gases heated at 300° C. to be generated were analyzed by means of a purge and trap gas chromatography and mass spectrometer (Japan Analysis Industry JHS-100) (GCMAS QP-5050A produced by Shimadzu Corp.). As a result, it was found that lipophilic aliphatic hydrocarbons (such as nonane, decane and 3-methyl-2-heptene) and lipophilic aromatic hydrocarbons (such as xylene) were removed from the carbon particles by the above-described oxidation treatment.

As a base material, there was prepared a plate material of a Cu—Ni—Sn—P alloy (a plate material of a copper alloy comprising 1.0% by weight of nickel, 0.9% by weight of tin, 0.05% by weight of phosphorus and the balance being copper) (NB-109EH produced by DOWA METALTECH CO., LTD.) having a thickness of 0.2 mm. Then, this base material and a platinized titanium mesh electrode plate (of a mesh material of titanium plated with platinum) were used as a cathode and an anode, respectively, for electroplating (silver-strike-plating) the base material at a current density of 5 A/dm$^2$ for 30 seconds in a sulfonic acid-containing silver-strike-plating solution (Dyne Silver GPE-ST produced by Daiwa Fine Chemicals Co., Ltd.) containing a sulfonic acid as a complexing agent.

Then, the above-described carbon particles (graphite particles) oxidation-treated were added to a sulfonic acid-containing silver-plating solution (containing a sulfonic acid as a complexing agent and having a silver concentration of 30 g/L) (Dyne Silver GPE-PL (dull luster) produced by Daiwa Fine Chemicals Co., Ltd.) to prepare a sulfonic acid-containing silver-plating solution containing 30 g/L of carbon particles and 30 g/L of Ag.

Then, the above-described silver-strike-plated base material and a silver electrode plate were used as a cathode and an anode, respectively, for electroplating (current efficiency=95%) the base material at a temperature of 25° C. and a current density of 3 A/dm$^2$ for 250 seconds in the above-described sulfonic acid-containing silver-plating solution containing the carbon particles while stirring the solution at 500 rpm. Thus, a composite plating film (Ag—C plating film) containing the carbon particles in a silver-plating layer was formed on the base material. The thickness of this composite plating film (in a range having a diameter of 1.0 mm in the central portion thereof) was measured by means of an X-ray fluorescent analysis thickness meter (FT9450 produced by Hitachi High-Tech Science Corporation). As a result, the thickness was 5.2 μm.

Then, the composite plating film was ultrasonic-cleaned at 38 kHz for 5 seconds in pure water by means of an ultrasonic cleaner (USK-5 produced by AS ONE Corporation) to carry out a treatment for removing part of the carbon particles on the surface thereof, and then, washed with pure water to be dried by means of an air blow device to prepare a composite plated product.

The surface of a test piece cut out of the composite plated product thus obtained was observed for calculating the percentage (area ratio (area %)) of the area occupied by the carbon particles on the surface of the composite plating film. The area ratio of the carbon particles on the surface of the composite plating film was calculated as follows. First, the surface of the test piece was irradiated with electron beams at an accelerating voltage of 5 kV by means of a desk top electron microscope (TM4000 Plus produced by Hitachi High-Tech Corporation) to obtain a compositional image in BE mode (COMPO image) (at a magnification of 1000) by means of a backscattered electron detector. The binarization of the tone of the COMPO image thus obtained was carried out by means of an image analyzing application (Image Editing/Processing Software GIMP 2.10.6) (so that pixels having a brightness of 127 or less were black and pixels having a brightness of higher than 127 were white assuming that the highest brightness of all of the pixels was 255 and that the lowest brightness thereof was 0). Thus, the COMPO image was divided into portions of silver (white portions) and portions of the carbon particles (black portions). The area ratio of the carbon particles on the surface of the composite plating film was calculated as a ratio Y/X of the number Y of the pixels of the portions of the carbon particles to the number X of the pixels of the whole image. As a result, the percentage (area ratio) of the area occupied by the carbon particles on the surface of the composite plating film was 32 area %. Furthermore, with respect to the composite plated product before the treatment for removing part of the carbon particles on the surface thereof, the percentage (area ratio) of the area occupied by the carbon particles on the surface of the composite plating film was calculated by the same method as the above-described method. As a result, the area ratio was 64 area %. Therefore, the variation in area ratio due to the treatment for removing part of the carbon particles on the surface was 32 area % (=64 area %−32 area %), and the rate of the variation in area ratio (the removal rate of the carbon particles due to the treatment for removing part of the carbon particles on the surface) was 50 area % (=(64−32) area %×100/64 area %).

Then, the image of the surface of the composite plating film of the obtained composite plated product was taken at a magnification of 100 by means of a laser microscope (VK-X1000 produced by Keyence Corporation). This image was analyzed by means of an analyzing application (VK-HIXA version 3.8.0.0 produced by Keyence Corporation) to calculate the arithmetic average roughness Ra being a parameter denoting the surface roughness of the surface of the composite plating film (in directions perpendicular to the rolling directions of the copper alloy plate) on the basis of JIS B0601 (2001). As a result, the arithmetic average roughness Ra was 0.75 μm.

Then, two test pieces were cut-off from the composite plated product, one of the test pieces being used as a plate-shaped test piece (an evaluating sample), and the other test piece being indented (semi-spherically punched so as to have an inside R of 1.0 mm) to be used as an indented test piece (indenter). Then, the wear resistance of the composite plated product was evaluated by carrying out an abrasion test for confirming the abrasion status of the plate-shaped test piece when the reciprocating sliding movement (sliding distance=10 mm, sliding speed=3 mm/s) was continued until the base material was exposed while the indented test piece was pushed against the plate-shaped test piece at a constant load (2N) by means of a sliding abrasion testing machine (produced by Yamasaki-Seiki Co., Ltd.). After the reciprocating sliding movement was repeated 500 times, the central portion of the sliding scratch of the plate-shaped test piece was observed at a magnification of 200 by means of a microscope (VHX-1000 produced by Keyence Corporation). As a result, it was confirmed that the (brown) base material was not exposed, so that it was found that the wear resistance thereof was good. The forces applied in the horizontal directions during the above-described reciprocating sliding movement were measured to calculate an average value F thereof, and the coefficient (μ) of dynamic friction between the plate-shaped test piece and the indented test piece was calculated from μ=F/N. As a result, the coefficient of dynamic friction was 0.24.

Then, after an adhesive tape (Cellotape (Registered Trademark) CT-18 (having an adhesive force of 4.02 N/10 mm) produced by NICHIBAN CO., LTD.) was applied on the surface of a test piece cut out of the obtained composite plated product, it was peeled off from the surface thereof, and the adhesion of the composite plating film was evaluated. As a result, the composite plating film was not peeled off, so that the adhesion of the composite plating film was good. In addition, the carbon particles adhered to the adhesive tape peeled off was observed at a magnification of 1000 by means of a laser microscope (VKX-160 produced by Keyence Corporation) to count the number of the carbon particles adhered to the adhesive tape (the carbon particles dropped out of the composite plating film). As a result, the number of the carbon particles was $9600/mm^2$.

Example 2

A composite plated product was prepared by the same method as that in Example 1, except that the ultrasonic cleaning time was 250 seconds.

With respect to the composite plated product thus obtained, the percentage (area ratio) of the area occupied by the carbon particles on the surface of the composite plating film was calculated by the same method as that in Example 1. As a result, the area ratio was 26 area %. With respect to the composite plated product before the treatment for removing part of the carbon particles on the surface thereof, the area ratio was 64 area %. Therefore, the variation in area ratio due to the treatment for removing part of the carbon particles on the surface was 38 area % (=64 area %−26 area %), and the rate of the variation in area ratio was 59 area % (=(64−26) area %×100/64 area %).

With respect to the obtained composite plated product, the arithmetic average roughness Ra was calculated by the same method as that in Example 1. As a result, the arithmetic average roughness Ra was 0.55 μm.

With respect to the obtained composite plated product, the wear resistance was evaluated by the same method as that in Example 1, and the coefficient of dynamic friction was calculated by the same method as that in Example 1. As a result, after the reciprocating sliding movement was repeated 500 times, it was confirmed that the (brown) base material was not exposed, so that it was found that the wear resistance thereof was good. The coefficient of dynamic friction was 0.52.

With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good. The number of the carbon particles dropped out of the composite plating film was $4800/mm^2$.

Example 3

A composite plated product was prepared by the same method as that in Example 1, except that the silver-strike-plating was carried out after a nickel plating film having a thickness of 0.3 μm was formed on the base material by electroplating (nickel-plating) the base material at a liquid temperature of 45° C. and a current density of 4 $A/dm^2$ for 30 seconds during stirring in a nickel-plating bath containing 80 g/L of nickel aminosulfonate and 45 g/L of boric acid, the electroplating using the base material and a nickel electrode plate as a cathode and an anode, respectively.

With respect to the composite plated product thus obtained, the percentage (area ratio) of the area occupied by the carbon particles on the surface of the composite plating film was calculated by the same method as that in Example 1. As a result, the area ratio was 32 area %. With respect to the composite plated product before the treatment for removing part of the carbon particles on the surface thereof, the area ratio was 64 area %. Therefore, the variation in area ratio due to the treatment for removing part of the carbon particles on the surface was 32 area % (=64 area %−32 area %), and the rate of the variation in area ratio was 50 area % (=(64−50) area %×100/64 area %).

With respect to the obtained composite plated product, the arithmetic average roughness Ra was calculated by the same method as that in Example 1. As a result, the arithmetic average roughness Ra was 0.75 μm.

With respect to the obtained composite plated product, the wear resistance was evaluated by the same method as that in Example 1, and the coefficient of dynamic friction was calculated by the same method as that in Example 1. As a result, after the reciprocating sliding movement was repeated 500 times, it was confirmed that the (brown) base material was not exposed, so that it was found that the wear resistance thereof was good. The coefficient of dynamic friction was 0.24.

With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good. The number of the carbon particles dropped out of the composite plating film was $9600/mm^2$.

Example 4

A composite plated product was prepared by the same method as that in Example 1, except that scale-shaped graphite particles having an average particle diameter of 2 μm was used as the carbon particles and that the electroplating time was 25 seconds when the composite plating film was formed. The thickness of the composite plating film was measured by the same method as that in Example 1 before the treatment for removing part of the carbon particles on the surface thereof was carried out. As a result, the thickness was 0.5 μm.

With respect to the composite plated product thus obtained, the percentage (area ratio) of the area occupied by the carbon particles on the surface of the composite plating film was calculated by the same method as that in Example 1. As a result, the area ratio was 2 area %. With respect to the composite plated product before the treatment for removing part of the carbon particles on the surface thereof, the area ratio was 5 area %. Therefore, the variation in area ratio due to the treatment for removing part of the carbon particles on the surface was 3 area % (=5 area %−2 area %), and the rate of the variation in area ratio was 60 area % (=(5−2) area %×100/5 area %).

With respect to the obtained composite plated product, the arithmetic average roughness Ra was calculated by the same method as that in Example 1. As a result, the arithmetic average roughness Ra was 0.23 μm.

With respect to the obtained composite plated product, the wear resistance was evaluated by the same method as that in Example 1, and the coefficient of dynamic friction was calculated by the same method as that in Example 1. As a result, after the reciprocating sliding movement was repeated 500 times, it was confirmed that the (brown) base material was not exposed, so that it was found that the wear resistance thereof was good. The coefficient of dynamic friction was 0.13.

With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good.

The number of the carbon particles dropped out of the composite plating film was 8400/mm$^2$.

Example 5

A composite plated product was prepared by the same method as that in Example 1, except that scale-shaped graphite particles having an average particle diameter of 10 μm was used as the carbon particles and that the electroplating time was 500 seconds when the composite plating film was formed. The thickness of the composite plating film was measured by the same method as that in Example 1 before the treatment for removing part of the carbon particles on the surface thereof was carried out. As a result, the thickness was 10.6 μm.

With respect to the composite plated product thus obtained, the percentage (area ratio) of the area occupied by the carbon particles on the surface of the composite plating film was calculated by the same method as that in Example 1. As a result, the area ratio was 34 area %. With respect to the composite plated product before the treatment for removing part of the carbon particles on the surface thereof, the area ratio was 62 area %. Therefore, the variation in area ratio due to the treatment for removing part of the carbon particles on the surface was 28 area % (=62 area %−34 area %), and the rate of the variation in area ratio was 45 area % (=(62−34) area %×100/62 area %).

With respect to the obtained composite plated product, the arithmetic average roughness Ra was calculated by the same method as that in Example 1. As a result, the arithmetic average roughness Ra was 1.28 μm.

With respect to the obtained composite plated product, the wear resistance was evaluated by the same method as that in Example 1, and the coefficient of dynamic friction was calculated by the same method as that in Example 1. As a result, after the reciprocating sliding movement was repeated 500 times, it was confirmed that the (brown) base material was not exposed, so that it was found that the wear resistance thereof was good. The coefficient of dynamic friction was 0.47.

With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good. The number of the carbon particles dropped out of the composite plating film was 7600/mm$^2$.

Example 6

A composite plated product was prepared by the same method as that in Example 1, except that the ultrasonic cleaning was carried out at 28 kHz for 30 seconds by means of an ultrasonic cleaner (VS-100III produced by AS ONE Corporation).

With respect to the composite plated product thus obtained, the percentage (area ratio) of the area occupied by the carbon particles on the surface of the composite plating film was calculated by the same method as that in Example 1. As a result, the area ratio was 19 area %. With respect to the composite plated product before the treatment for removing part of the carbon particles on the surface thereof, the area ratio was 64 area %. Therefore, the variation in area ratio due to the treatment for removing part of the carbon particles on the surface was 45 area % (=64 area %−19 area %), and the rate of the variation in area ratio was 70 area % (=(64−19) area %×100/64 area %).

With respect to the obtained composite plated product, the arithmetic average roughness Ra was calculated by the same method as that in Example 1. As a result, the arithmetic average roughness Ra was 0.37 μm.

With respect to the obtained composite plated product, the wear resistance was evaluated by the same method as that in Example 1, and the coefficient of dynamic friction was calculated by the same method as that in Example 1. As a result, after the reciprocating sliding movement was repeated 500 times, it was confirmed that the (brown) base material was not exposed, so that it was found that the wear resistance thereof was good. The coefficient of dynamic friction was 0.31. With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good. The number of the carbon particles dropped out of the composite plating film was 3200/mm$^2$.

Example 7

A composite plated product was prepared by the same method as that in Example 1, except that the treatment for removing part of the carbon particles on the surface of the composite plating film was carried out by substituting the ultrasonic cleaning for electrolytic cleaning at 4 A/dm$^2$ for 30 seconds in an electrolyte solution, which is prepared by dissolving 10% by weight of a cleaning rust-preventive agent (a slightly alkaline liquid for being sprayed) (BONDERITE C-AK PZ produced by Henkel Japan Ltd.) in pure water, using an anode plate of SUS304 and a cathode being the base material having the composite plating film.

With respect to the composite plated product thus obtained, the percentage (area ratio) of the area occupied by the carbon particles on the surface of the composite plating film was calculated by the same method as that in Example 1. As a result, the area ratio was 47 area %. With respect to the composite plated product before the treatment for removing part of the carbon particles on the surface thereof, the area ratio was 64 area %. Therefore, the variation in area ratio due to the treatment for removing part of the carbon particles on the surface was 17 area % (=64 area %−47 area %), and the rate of the variation in area ratio was 27 area % (=(64−47) area %×100/64 area %).

With respect to the obtained composite plated product, the arithmetic average roughness Ra was calculated by the same method as that in Example 1. As a result, the arithmetic average roughness Ra was 0.79 μm.

With respect to the obtained composite plated product, the wear resistance was evaluated by the same method as that in Example 1. As a result, after the reciprocating sliding movement was repeated 500 times, it was confirmed that the (brown) base material was not exposed, so that it was found that the wear resistance thereof was good.

With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good.

The number of the carbon particles dropped out of the composite plating film was 28000/mm$^2$.

Example 8

A composite plated product was prepared by the same method as that in Example 7, except that the electrolytic cleaning time was 250 seconds.

With respect to the composite plated product thus obtained, the percentage (area ratio) of the area occupied by the carbon particles on the surface of the composite plating film was calculated by the same method as that in Example 1. As a result, the area ratio was 44 area %. With respect to the composite plated product before the treatment for removing part of the carbon particles on the surface thereof, the area ratio was 64 area %. Therefore, the variation in area ratio due to the treatment for removing part of the carbon particles on the surface was 20 area % (=64 area %−44 area %), and the rate of the variation in area ratio was 31 area % (=(64−44) area %×100/64 area %).

With respect to the obtained composite plated product, the arithmetic average roughness Ra was calculated by the same method as that in Example 1. As a result, the arithmetic average roughness Ra was 0.72 μm.

With respect to the obtained composite plated product, the wear resistance was evaluated by the same method as that in Example 1. As a result, after the reciprocating sliding movement was repeated 500 times, it was confirmed that the (brown) base material was not exposed, so that it was found that the wear resistance thereof was good.

With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good. The number of the carbon particles dropped out of the composite plating film was 19600/mm$^2$.

Example 9

A composite plated product was prepared by the same method as that in Example 7, except that the electrolytic cleaning was carried out at 20 A/dm$^2$.

With respect to the composite plated product thus obtained, the percentage (area ratio) of the area occupied by the carbon particles on the surface of the composite plating film was calculated by the same method as that in Example 1. As a result, the area ratio was 43 area %. With respect to the composite plated product before the treatment for removing part of the carbon particles on the surface thereof, the area ratio was 64 area %. Therefore, the variation in area ratio due to the treatment for removing part of the carbon particles on the surface was 21 area % (=64 area %−43 area %), and the rate of the variation in area ratio was 33 area % (=(64−43) area %×100/64 area %).

With respect to the obtained composite plated product, the arithmetic average roughness Ra was calculated by the same method as that in Example 1. As a result, the arithmetic average roughness Ra was 0.74 μm.

With respect to the obtained composite plated product, the wear resistance was evaluated by the same method as that in Example 1. As a result, after the reciprocating sliding movement was repeated 500 times, it was confirmed that the (brown) base material was not exposed, so that it was found that the wear resistance thereof was good.

With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good. The number of the carbon particles dropped out of the composite plating film was 23600/mm$^2$.

Example 10

A composite plated product was prepared by the same method as that in Example 8, except that the electrolytic cleaning was carried out at 20 A/dm$^2$.

With respect to the composite plated product thus obtained, the percentage (area ratio) of the area occupied by the carbon particles on the surface of the composite plating film was calculated by the same method as that in Example 1. As a result, the area ratio was 39 area %. With respect to the composite plated product before the treatment for removing part of the carbon particles on the surface thereof, the area ratio was 64 area %. Therefore, the variation in area ratio due to the treatment for removing part of the carbon particles on the surface was 25 area % (=64 area %−39 area %), and the rate of the variation in area ratio was 39 area % (=(64−39) area %×100/64 area %).

With respect to the obtained composite plated product, the arithmetic average roughness Ra was calculated by the same method as that in Example 1. As a result, the arithmetic average roughness Ra was 0.63 μm.

With respect to the obtained composite plated product, the wear resistance was evaluated by the same method as that in Example 1. As a result, after the reciprocating sliding movement was repeated 500 times, it was confirmed that the (brown) base material was not exposed, so that it was found that the wear resistance thereof was good.

With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good. The number of the carbon particles dropped out of the composite plating film was 14000/mm$^2$.

Comparative Example 1

A composite plated product was prepared by the same method as that in Example 1, except that the treatment for removing part of the carbon particles on the surface of the composite plating film was not carried out.

With respect to the composite plated product thus obtained, the arithmetic average roughness Ra was calculated by the same method as that in Example 1. As a result, the arithmetic average roughness Ra was 1.78 μm.

With respect to the obtained composite plated product, the wear resistance was evaluated by the same method as that in Example 1, and the coefficient of dynamic friction was calculated by the same method as that in Example 1. As a result, after the reciprocating sliding movement was repeated 500 times, it was confirmed that the (brown) base material was not exposed, so that it was found that the wear resistance thereof was good. The coefficient of dynamic friction was 0.19.

With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good. The number of the carbon particles dropped out of the composite plating film was 51200/mm$^2$.

Comparative Example 2

A composite plated product was prepared by the same method as that in Example 4, except that the treatment for removing part of the carbon particles on the surface of the composite plating film was not carried out.

With respect to the composite plated product thus obtained, the arithmetic average roughness Ra was calculated by the same method as that in Example 1. As a result, the arithmetic average roughness Ra was 0.34 μm.

With respect to the obtained composite plated product, the wear resistance was evaluated by the same method as that in Example 1, and the coefficient of dynamic friction was calculated by the same method as that in Example 1. As a result, after the reciprocating sliding movement was repeated 500 times, it was confirmed that the (brown) base material was not exposed, so that it was found that the wear resistance thereof was good. The coefficient of dynamic friction was 0.12.

With respect to the obtained composite plated product, the adhesion of the composite plating film was evaluated by the same method as that in Example 1, and the number of the carbon particles dropped out of the composite plating film was counted by the same method as that in Example 1. As a result, the composite plating film was not peeled off, so that the adhesion of the composite plating film was good. The number of the carbon particles dropped out of the composite plating film was 35600/mm$^2$.

Comparative Example 3

A composite plated product was prepared by the same method as that in Example 1, except that a silver-plating film was formed on the composite plating film after the composite plating film was formed and that the treatment for removing part of the carbon particles on the surface of the composite plating film was not carried out. Furthermore, the silver-plating film was formed by electroplating at a liquid temperature of 25° C. and a current density of 3 A/dm$^2$ for 60 seconds in a sulfonic acid-containing silver-plating solution (containing a sulfonic acid as a complexing agent and having a silver concentration of 30 g/L) (Dyne Silver GPE-PL (dull luster) produced by Daiwa Fine Chemicals Co., Ltd.).

With respect to the composite plated product thus obtained, the percentage (area ratio) of the area occupied by the carbon particles on the surface of the composite plating film was calculated by the same method as that in Example 1. As a result, the area ratio was 36 area %. With respect to the composite plated product after the silver-plating film was formed, the area ratio was 64 area %.

With respect to the obtained composite plated product, the arithmetic average roughness Ra was calculated by the same method as that in Example 1. As a result, the arithmetic average roughness Ra was 0.76 μm.

With respect to the obtained composite plated product, the wear resistance was evaluated by the same method as that in Example 1, and the coefficient of dynamic friction was calculated by the same method as that in Example 1. As a result, after the reciprocating sliding movement was repeated 500 times, it was confirmed that the (brown) base material was not exposed, so that it was found that the wear resistance thereof was good. The coefficient of dynamic friction was 0.19.

With respect to the obtained composite plated product, the adhesion of the composite plating film was evaluated by the same method as that in Example 1, and the number of the carbon particles dropped out of the composite plating film was counted by the same method as that in Example 1. As a result, the silver-plating film formed on the composite plating film was peeled off, so that the adhesion of the silver-plating film was not good. The number of the carbon particles dropped out of the composite plating film was 21200/mm$^2$.

Comparative Example 4

A silver-plated product was prepared by the same method as that in Example 4, except that a silver-plating film was formed in place of the composite plating film and that the treatment for removing part of the carbon particles on the surface thereof was not carried out. Furthermore, the silver-plating film was formed by electroplating at a liquid temperature of 25° C. and a current density of 3 A/dm$^2$ for 250 seconds in a sulfonic acid-containing silver-plating solution (containing a sulfonic acid as a complexing agent and having a silver concentration of 30 g/L) (Dyne Silver GPE-PL (dull luster) produced by Daiwa Fine Chemicals Co., Ltd.). The thickness of the silver-plating film of the silver-plated product was measured by the same method as that in Example 1. As a result, the thickness was 5.6 μm.

With respect to the silver-plated product thus obtained, the arithmetic average roughness Ra was calculated by the same method as that in Example 1. As a result, the arithmetic average roughness Ra was 0.19 μm.

With respect to the obtained composite plated product, the wear resistance was evaluated by the same method as that in Example 1, and the coefficient of dynamic friction was calculated by the same method as that in Example 1. As a result, after the reciprocating sliding movement was repeated 57 times, it was confirmed that the (brown) base material was exposed, so that it was found that the wear resistance thereof was not good. The coefficient of dynamic friction was 1.85.

With respect to the obtained composite plated product, the adhesion of the composite plating film was evaluated by the same method as that in Example 1. As a result, the composite plating film was not peeled off, so that the adhesion of the composite plating film was good.

Comparative Example 5

A silver-plated product was prepared by the same method as that in Example 1, except that the silver-strike-plating was carried out at a current density of 3 A/dm$^2$ for 10 seconds, that a silver-plating film containing antimony was formed in place of the composite plating film and that the treatment for removing part of the carbon particles on the surface thereof was not carried out. Furthermore, the silver-plating film containing antimony was formed by electroplating at a liquid temperature of 25° C. and a current density of 1 A/dm$^2$ for 400 seconds in a silver-plating solution containing antimony (produced by NISSIN-KASEI CO., LTD.). The thickness of the silver-plating film of the silver-plated product was measured by the same method as that in Example 1. As a result, the thickness was 5.3 μm.

With respect to the silver-plated product thus obtained, the arithmetic average roughness Ra was calculated by the same method as that in Example 1. As a result, the arithmetic average roughness Ra was 0.10 μm.

With respect to the obtained composite plated product, the wear resistance was evaluated by the same method as that in Example 1, and the coefficient of dynamic friction was calculated by the same method as that in Example 1. As a result, after the reciprocating sliding movement was repeated 370 times, it was confirmed that the (brown) base material was exposed, so that it was found that the wear resistance thereof was not good. The coefficient of dynamic friction was 0.82.

With respect to the obtained composite plated product, the adhesion of the composite plating film was evaluated by the same method as that in Example 1. As a result, the composite plating film was not peeled off, so that the adhesion of the composite plating film was good.

The producing conditions and characteristics of the plated products in these examples and comparative examples are shown in Tables 1 through 3. In Table 3, "o" is shown if the adhesion of the plating film was good, and "x" is shown if the adhesion of the plating film was not good.

TABLE 1

| | Surface-side Plating Film | | | Thickness of Additional Ag (μm) | Thickness of Underlying Ni Plating Film (μm) |
|---|---|---|---|---|---|
| | Kind | Thickness (μm) | Carbon Particle Diameter (μm) | | |
| Ex. 1 | Ag—C | 5.2 | 5 | — | — |
| Ex. 2 | Ag—C | 5.2 | 5 | — | — |
| Ex. 2 | Ag—C | 5.2 | 5 | — | 0.3 |
| Ex. 4 | Ag—C | 0.5 | 2 | — | — |
| Ex. 5 | Ag—C | 10.6 | 10 | — | — |
| Ex. 6 | Ag—C | 5.2 | 5 | — | — |
| Ex. 7 | Ag—C | 5.2 | 5 | — | — |
| Ex. 8 | Ag—C | 5.2 | 5 | — | — |
| Ex. 9 | Ag—C | 5.2 | 5 | — | — |
| Ex. 10 | Ag—C | 5.2 | 5 | — | — |
| Comp. 1 | Ag—C | 5.2 | 5 | — | — |
| Comp. 2 | Ag—C | 0.5 | 2 | — | — |
| Comp. 3 | Ag—C | 5.2 | 5 | 1.4 | — |
| Comp. 4 | Ag | 5.6 | — | — | — |
| Comp. 5 | AgSb | 5.3 | — | — | — |

TABLE 2

| | Removal of Carbon Particles | | Amount of Carbon Particles on Surface (area %) | | | Surface Roughness |
|---|---|---|---|---|---|---|
| | Method | Conditions | Before Treatment | After Treatment | Removal Rate | Ra (μm) |
| Ex. 1 | Ultrasonic | 38 kHz × 5 s | 64 | 32 | 50 | 0.75 |
| Ex. 2 | Ultrasonic | 38 kHz × 250 s | 64 | 26 | 59 | 0.55 |
| Ex. 3 | Ultrasonic | 38 kHz × 5 s | 64 | 32 | 50 | 0.75 |
| Ex. 4 | Ultrasonic | 38 kHz × 5 s | 5 | 2 | 60 | 0.23 |
| Ex. 5 | Ultrasonic | 38 kHz × 5 s | 62 | 34 | 45 | 1.28 |
| Ex. 6 | Ultrasonic | 28 kHz × 30 s | 64 | 19 | 70 | 0.37 |
| Ex. 7 | Electrolytic Degreasing | 4 A/dm$^2$ × 30 s | 64 | 47 | 27 | 0.79 |
| Ex. 8 | Electrolytic Degreasing | 4 A/dm$^2$ × 250 s | 64 | 44 | 31 | 0.72 |
| Ex. 9 | Electrolytic Degreasing | 20 A/dm$^2$ × 30 s | 64 | 43 | 33 | 0.74 |
| Ex. 10 | Electrolytic Degreasing | 20 A/dm$^2$ × 250 s | 64 | 39 | 39 | 0.63 |
| Comp. 1 | — | — | 64 | — | 0 | 1.78 |
| Comp. 2 | — | — | 5 | — | 0 | 0.34 |
| Comp. 3 | — | — | — | — | — | 0.76 |
| Comp. 4 | — | — | — | — | — | 0.19 |
| Comp. 5 | — | — | — | — | — | 0.10 |

TABLE 3

| | Wear Resistance | Coefficient of Friction | Amount of Dropped Carbon Particles (/mm$^2$) | Adhesion of Plating Film |
|---|---|---|---|---|
| Ex. 1 | Not less than 500 | 0.24 | 9600 | ○ |
| Ex. 2 | Not less than 500 | 0.52 | 4800 | ○ |
| Ex. 3 | Not less than 500 | 0.24 | 9600 | ○ |
| Ex. 4 | Not less than 500 | 0.13 | 8400 | ○ |
| Ex. 5 | Not less than 500 | 0.47 | 7600 | ○ |
| Ex. 6 | Not less than 500 | 0.31 | 3200 | ○ |
| Ex. 7 | Not less than 500 | | 28000 | ○ |
| Ex. 8 | Not less than 500 | | 19600 | ○ |
| Ex. 9 | Not less than 500 | | 23600 | ○ |
| Ex. 10 | Not less than 500 | | 14000 | ○ |
| Comp. 1 | Not less than 500 | 0.19 | 51200 | ○ |
| Comp. 2 | Not less than 500 | 0.12 | 35600 | ○ |
| Comp. 3 | Not less than 500 | 0.19 | 21200 | x |
| Comp. 4 | 57 | 1.85 | — | ○ |
| Comp. 5 | 370 | 0.82 | — | ○ |

The invention claimed is:

1. A composite plated product comprising:

a base material; and a composite plating film of a composite material which contains carbon particles in a silver layer, the composite plating film being formed on the base material, wherein the percentage of an area occupied by the carbon particles on the surface of the composite plating film is in the range of from 1 area % to 50 area %, and wherein the number of the carbon particles adhered to an adhesive tape having an adhesive force of 4.02 N/10 mm is not larger than 35,000/mm$^2$ when the adhesive tape is peeled off from the surface of the composite plating film after it is put thereon.

2. A composite plated product as set forth in claim 1, wherein said composite plating film has a thickness of 0.5 to 15 μm.

3. A composite plated product as set forth in claim 1, which has a surface roughness Ra of 0.2 to 1.7 μm.

4. A composite plated product as set forth in claim 1, which has a friction coefficient of not larger than 0.8.

5. A composite plated product as set forth in claim 1, which further comprises a nickel-plating film formed between said composite plating film and said base material.

6. A terminal, the material of which is a composite plated product as set forth in claim 1.

7. A composite plated product as set forth in claim 2, which has a surface roughness Ra of 0.2 to 1.7 μm.

8. A composite plated product as set forth in claim 1, which has a surface roughness Ra of 0.2 to 1.3 μm.

9. A composite plated product as set forth in claim 1, wherein said composite plating layer is an outermost surface layer.

* * * * *